United States Patent
Lee et al.

(10) Patent No.: US 8,574,474 B2
(45) Date of Patent: Nov. 5, 2013

(54) PROCESS OF MAKING PARA-ARAMID FIBERS

(75) Inventors: Jae Young Lee, Daegu (KR); Jae Young Kim, Gumi-si (KR); Tae Hak Park, Gyeongsangbuk-do (KR); Sang Young Yeo, Daegu (KR)

(73) Assignee: Kolon Industries, Inc., Kwacheon-si (KR)

( * ) Notice: Subject to any disclaimer, the term of this patent is extended or adjusted under 35 U.S.C. 154(b) by 0 days.

(21) Appl. No.: 13/290,329

(22) Filed: Nov. 7, 2011

(65) Prior Publication Data

US 2012/0049406 A1 Mar. 1, 2012

Related U.S. Application Data

(62) Division of application No. 12/935,539, filed as application No. PCT/KR2009/001636 on Mar. 31, 2009.

(30) Foreign Application Priority Data

Mar. 31, 2008 (KR) .......................... 10-2008-0030077
Mar. 24, 2009 (KR) .......................... 10-2009-0024846

(51) Int. Cl.
*D01D 5/06* (2006.01)
*D01F 6/60* (2006.01)

(52) U.S. Cl.
USPC .......................................... 264/180; 264/184

(58) Field of Classification Search
USPC .............................. 264/178 R, 180, 181, 184
See application file for complete search history.

(56) References Cited

U.S. PATENT DOCUMENTS

| 4,298,565 A | 11/1981 | Yang |
| 4,340,559 A | 7/1982 | Yang |
| 4,702,876 A * | 10/1987 | Ebregt et al. .................. 264/184 |
| 4,876,040 A | 10/1989 | Park et al. |

(Continued)

FOREIGN PATENT DOCUMENTS

| JP | 2-307910 A | 12/1990 |
| KR | 0177856 B1 | 2/1999 |

(Continued)

OTHER PUBLICATIONS

Extended European Search Report dated May 16, 2011 for European Application No. 09754911.7.

(Continued)

*Primary Examiner* — Leo B Tentoni
(74) *Attorney, Agent, or Firm* — Birch, Stewart, Kolasch & Birch, LLP

(57) ABSTRACT

An aramid fiber and a method of producing the same is disclosed, which is capable of realizing high surface uniformity and improved tensile strength and elongation property, wherein the method comprises preparing an aromatic polyamide by polymerizing aromatic diamine with aromatic diacid halide; preparing a spinning dope by dissolving the aromatic polyamide in a solvent; and extruding the spinning dope through a spinneret, and sequentially passing the spinning dope through an air gap, a coagulation bath filled with a coagulation solution, and a coagulation tube having a jet opening, connected with the bottom of the coagulation bath, to obtain a filament wherein a distance from the upper surface of the coagulation solution contained in the coagulation bath to the jet opening of the coagulation tube is within a range between 10 and 35 mm.

14 Claims, 1 Drawing Sheet

(56) References Cited

U.S. PATENT DOCUMENTS

| | | | |
|---|---|---|---|
| 4,898,704 A | 2/1990 | Luckey | |
| 5,853,640 A | 12/1998 | Furumai et al. | |
| 2008/0200640 A1 | 8/2008 | Han et al. | |

FOREIGN PATENT DOCUMENTS

| | | |
|---|---|---|
| KR | 10-0431679 B1 | 5/2004 |
| KR | 10-0749962 B1 | 8/2007 |
| WO | WO 2007/004848 A1 | 1/2007 |
| WO | WO 2007/004849 A1 | 1/2007 |
| WO | WO 2007/004851 A1 | 1/2007 |

OTHER PUBLICATIONS

International Search Report, dated Oct. 19, 2009, issued in PCT/KR2009/001636.

Zhang et al., "Surface Modification of Aramid Fibers with γ-Ray Radiation for Improving Interfacial Bonding Strength with Epoxy Resin," Journal of Applied Polymer Science, vol. 106, 2007, pp. 2251-2262, XP002631913. (Published online Jul. 25, 2007).

Office Action for Japanese Application No. 2011-502852, dated Mar. 21, 2012.

* cited by examiner

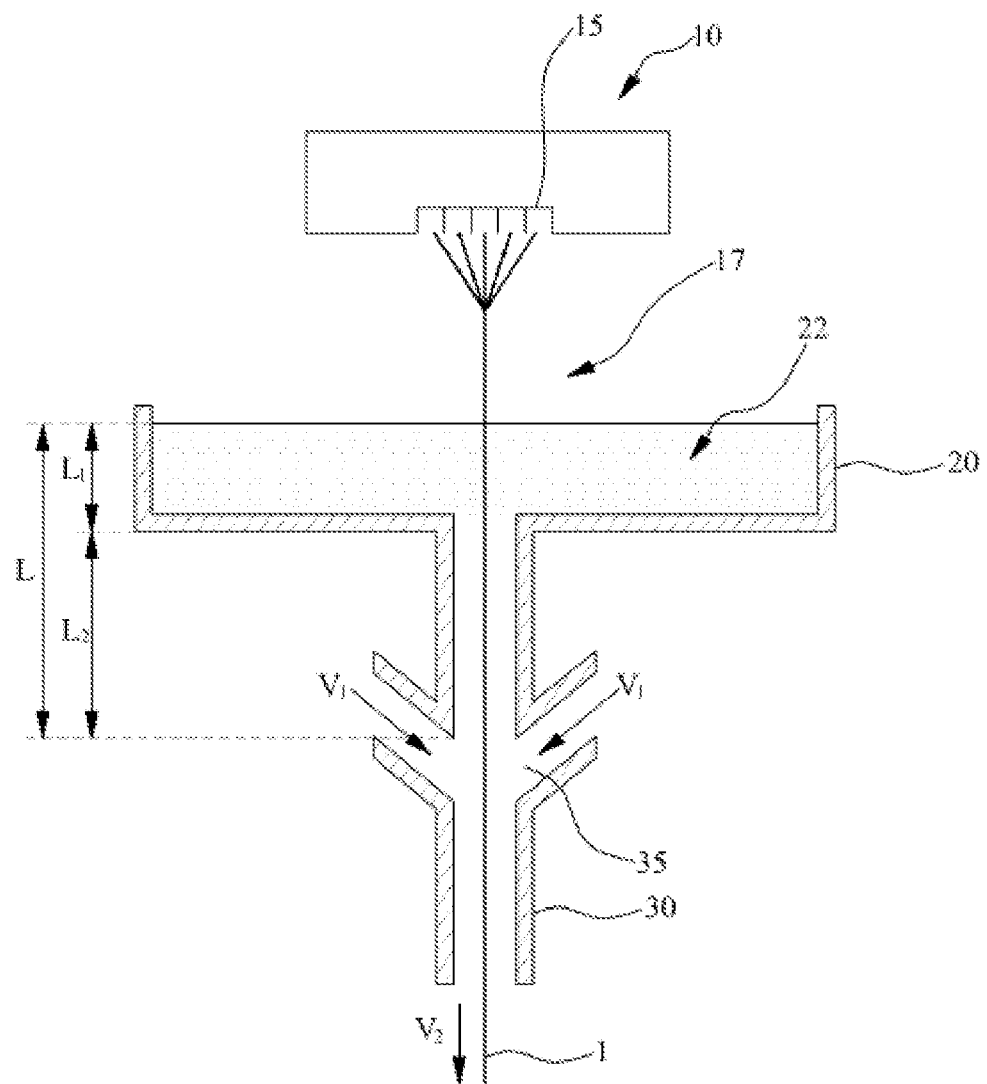

PROCESS OF MAKING PARA-ARAMID FIBERS

CROSS REFERENCE TO RELATED APPLICATIONS

This application is a Divisional of copending U.S. application Ser. No. 12/935,539, filed on Oct. 28, 2010, which is a National Phase of PCT International Application No. PCT/KR2009/001636 filed on Mar. 31, 2009, which claims priority under 35 U.S.C. 119(a) to Patent Application No. 10-2008-0030077 filed in the Republic of Korea on Mar. 31, 2008 and to Patent Application No. 10-2009-0024846 filed in the Republic of Korea on Mar. 24, 2009. The entire contents of all of the above applications are hereby incorporated by reference.

TECHNICAL FIELD

The present invention relates to a para-aramid fiber, and more particularly, to a para-aramid fiber with high surface-uniformity and great strength, and a method of preparing the same.

BACKGROUND ART

An aramid fiber may be classified into a para-aramid fiber and a metha-aramid fiber, wherein the para-aramid fiber is made in such a structure that benzene rings are linearly connected through an amide group (CONH). At this time, a strength of para-aramid fiber having a thickness of 5 mm is such as to lift up and maintain a two-ton car. Thus, the para-aramid fiber is used in various fields for advanced technology of aerospace industry as well as the industry for developing a bullet-resistant material.

A process for making an aromatic polyamide fiber commonly known as the aramid fiber includes steps of preparing an aromatic polyamide by polymerizing aromatic diamine with aromatic diacid chloride in a polymerization solvent containing N-methyl-2-pyrrolidone (NMP); preparing a spinning dope by dissolving the aromatic polyamide in a concentrated sulfuric acid solution; and preparing a filament by spinning the spinning dope using a spinneret and a coagulation bath.

This aramid fiber has a skin-core structure wherein the modulus in a surface layer of the aramid fiber is higher than the modulus in a core of the aramid fiber. That is, if a stress is applied to the aramid fiber, the stress is concentrated on the surface layer of the aramid fiber. Accordingly, a physical property in the surface layer of the aramid fiber is the most important component in determining the strength of the aramid fiber.

However, a related art method of preparing the aramid fiber can not realize a high strength of the aramid fiber since it is performed without consideration of the surface layer of the aramid fiber.

DISCLOSURE

Technical Problem

Therefore, the present invention has been made in view of the above problems, and it is an object of the present invention to provide an aramid fiber and a method of preparing the same, which is capable of preventing one or more problems of the related art.

The object of the present invention is to provide a para-aramid fiber with a high strength by enhancing a surface uniformity of aramid fiber, and a method of preparing the same. Hereinafter, the aramid fiber indicates the para-aramid fiber.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

For studying methods of preparing aramid fiber with high strength, it was found that surface uniformity of the aramid fiber had an effect on strength of the aramid fiber. That is, the high surface uniformity of the aramid fiber can improve the strength of the aramid fiber.

Also, when studying methods of improving the surface uniformity of the aramid fiber, it was found that the surface uniformity of the aramid fiber could be improved by controlling a spinning process.

To achieve these objects and other advantages and in accordance with the purpose of the invention, as embodied and broadly described herein, a method of preparing an aramid fiber comprises preparing an aromatic polyamide by polymerizing aromatic diamine with aromatic diacid halide; preparing an aromatic polyamide by polymerizing aromatic diamine with aromatic diacid halide; preparing a spinning dope by dissolving the aromatic polyamide in a solvent; and extruding the spinning dope through a spinneret, and sequentially passing the spinning dope through an air gap, a coagulation bath filled with a coagulation solution, and a coagulation tube having a jet opening, connected with the bottom of the coagulation bath, to obtain a filament, wherein a distance from the upper surface of the coagulation solution contained in the coagulation bath to the jet opening of the coagulation tube is within a range between 10 and 35 mm.

In another aspect of the present invention, there is a para-aramid fiber formed in such a structure that an amide group is connected with aromatic rings, and the aromatic rings are linearly connected through the amide group, wherein a surface roughness is RMS 0.2 µm or less, and a tensile strength is within a range between 22 g/d and 26 g/d.

Advantageous Effects

The aramid fiber according to the present invention and the method of preparing the same has the following advantages.

The surface uniformity of the aramid fiber can be improved owing to the optimized spinning, thereby resulting in the improved tensile strength and elongation property.

DESCRIPTION OF DRAWINGS

FIG. 1 is a schematic view illustrating a spinning apparatus according to one embodiment of the present invention.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Hereinafter, aramid fiber according to the present invention and a method of preparing the same will be described with reference to the accompanying drawings.

1. PREPARING AROMATIC POLYAMIDE

First, a polymerization solvent is prepared.

The polymerization solvent is prepared by adding inorganic salt to an organic solvent.

The organic solvent may be an amide-based organic solvent, a urea-based organic solvent, or their mixture, for example, N-methyl-2-pyrrolidone (NMP); N,N'-dimethylacetamide (DMAc); hexamethylphosphoramide (HMPA); N,N,N',N'-tetramethyl urea (TMU); N,N-dimethylformamide (DMF); or their mixtures.

The inorganic salt is added so as to enhance a degree of polymerization of aromatic polyamide. In more detail, the inorganic salt may be halogenated alkali metal salt or halogenated alkali earth metal salt, for example, $CaCl_2$, LiCl, NaCl, KCl, LiBr, or KBr. This inorganic salt may be added solely, or may be added in a mixtured type of two or more. According as the inorganic salt is added more, the degree of polymerization of aromatic polyamide is increased. However, if too much inorganic salt is added, un-dissolved inorganic salt may exist therein. Preferably, the inorganic salt in the entire polymerization solvent is provided at 10 weight % or less.

Next, a mixture solution is prepared by dissolving aromatic diamine in the polymerization solvent.

For example, the aromatic diamine may be para-phenylenediamine; 4,4'-diaminobiphenyl; 2,6-naphthalenediamine; 1,5-naphthalenediamine; or 4,4'-diaminobenzanilide. However, it is not limited to these.

Next, a predetermined amount of aromatic diacid halide is added to the mixture solution while stirring the mixture solution, thereby resulting in preliminary polymerization.

The polymerization of the aromatic diamine with the aromatic diacid halide is rapidly progressed while being accompanied by heat. In this case, a high polymerization speed may cause a problem related with a large polymerization difference among the polymers finally obtained. In more detail, since a polymerization reaction is not simultaneously progressed in the entire mixture solution, the early polymerized polymer has long molecular chains by the rapid polymerization reaction, while the late polymerized polymer has shorter molecular chains as compared to those of the early polymerized polymer. Furthermore, the more rapid polymerization speed causes the larger difference in degree of polymerization among the finally-obtained polymers. If there is the larger difference in degree of polymerization among the finally-obtained polymers, a property deviation becomes large, whereby it is difficult to realize a desired property.

Accordingly, the polymerization process follows the preliminary polymerization process related to preparation of the polymer having the molecular chain of a predetermined length, thereby minimizing the difference in degree of polymerization among the finally-obtained polymers.

The example of the aromatic diacid halide may be terephthaloyl dichloride; 4,4'-benzoyl dichloride; 2,6-naphthalenedicarboxyl acid dichloride; or 1,5-naphthalenedicarboxyl acid dichloride. However, it is not limited to these.

After completing the preliminary polymerization process, the remaining aromatic diacid halide is added to the mixture solution while being stirred at a temperature between 0 and 30° C. for the polymerization process.

Since the aromatic diacid halide reacts with the aromatic diamine at a mole ratio of 1:1, the aromatic diamine and the aromatic diacid halide are added at the same mole ratio.

Preferably, the amounts of the aromatic diamine and aromatic diacid halide are adjusted so that a concentration of the finally-obtained polymer in the entire polymerized solution is about 5 to 20 weight % when the polymerization process is completed. If the concentration of the finally-obtained polymer is less than 5 weight %, the polymerization speed is lowered and the polymerization reaction has to be continued for a relatively long period of time, whereby it lowers an economical efficiency. If the concentration of the finally-obtained polymer is more than 20 weight %, it is difficult to obtain an intrinsic viscosity of polymer above 5.5 due to the undesirable polymerization reaction.

The detailed example of the aromatic polyamide finally obtained by the polymerization process may be poly(paraphenylene terephtalamide: PPD-T); poly(4,4'-benzanilide terephtalamide); poly(paraphenylene-4,4'-biphenylene-dicarboxyl acid amide); or poly(paraphenylene-2,6-naphthalenedicarboxyl acid amide).

Next, an alkali compound is added to the polymerized solution containing the aromatic polyamide so as to neutralize the acid produced during the polymerization reaction.

The acid produced during the polymerization reaction, for example, hydrochloric acid, may cause a corrosion of a polymerization apparatus. Thus, an inorganic or organic alkali compound is added to the polymerized solution during or after the polymerization reaction, whereby the acid produced by the polymerization reaction is neutralized.

Since the aromatic polyamide obtained by the polymerization reaction exists in shape of crumbs, the polymerized solution containing aromatic polyamide has poor fluidity. In order to improve the fluidity, the polymerized solution containing aromatic polyamide is made as slurry by adding water to the polymerized solution, and then the following process is performed with the slurry-type polymerized solution, preferably. For this, water as well as the alkali compound may be added to the polymerized solution for the neutralization process.

The inorganic alkali compound may be selected from groups of carbonate of alkali metal or alkali earth metal, hydride of alkali earth metal, hydroxide of alkali earth metal, or oxide of alkali earth metal, for example, NaOH, $Li_2CO_3$, $CaCO_3$, LiH, $CaH_2$, LiOH, $Ca(OH)_2$, $Li_2O$, or CaO.

Next, the aromatic polyamide, from which the acid is removed by the neutralization process, is crushed.

If a grain size of the polymer is too large, it consumes a long period of time for an extracting process to be described, and an efficiency of extracting a polymerization solvent is lowered. In this respect, a crushing process is performed so as to decrease the grain size of the polymer before the extracting process.

Next, the polymerization solvent is extracted and removed from the aromatic polyamide.

Since the polymerization solvent used for the polymerization process is contained in the aromatic polyamide obtained by the polymerization, the polymerization solvent has to be extracted from the aromatic polyamide, and the extracted polymerization solvent has be to re-used for the polymerization process.

The extracting process using water is the most economical and efficient. The extracting process may be carried out by sequential steps of installing a filter in a tub with an outlet, pouring water while positioning the polymer above the filter, and discharging the polymerization solvent contained in the polymer together with water through the outlet.

After the extracting process, a dehydrating process is performed so as to remove the remaining water. Then, the aromatic polyamide is completed through a drying process. Thereafter, a classification process may be performed so as to classify the aromatic polyamide according to size for a spinning process.

2. PREPARING PARA-ARAMID FIBER

A spinning dope is prepared by dissolving the aromatic polyamide prepared by the aforementioned method in a solvent.

The solvent may use concentrated sulfuric acid having a concentration of 97 to 100%. Instead of the concentrated sulfuric acid, chloro-sulfuric acid or fluoro-sulfuric acid may be used.

Preferably, the concentration of polymer in the spinning dope is about 10 to 25 weight %, so as to realize a good fiber property.

According as the concentration of polyamide polymer is increased more, a viscosity of spinning dope is also increased. However, if the concentration of polymer is more than a critical concentration point, the viscosity of spinning dope is suddenly decreased. At this time, the spinning dope is changed from an optically-isotropic state to an optically-anisotropic state without forming a solid phase. Structural and functional properties of the optically-anisotropic spinning dope enable production of aramid fiber having high strength without an additional drawing process. Preferably, the concentration of the polyamide polymer in the spinning dope is higher than the critical concentration point. However, if the concentration of the polyamide polymer is too high, it may cause a problem of low viscosity in the spinning dope.

As shown in FIG. 1, after the spinning dope extrudes through a spinneret 10, the spinning dope sequentially passes through an air gap 17, a coagulation bath 20, and a coagulation tube 30, thereby preparing a filament 1.

The spinneret 10 is provided with a plurality of capillary tubes 15, wherein each capillary tube 15 has a diameter of 0.1 mm or less. If the diameter in each capillary tube 15 of the spinneret 10 is more than 0.1 mm, the strength of filament 1 becomes lowered due to the poor molecular orientation of the prepared filament.

The air gap 17 may be used of an air layer or inert gas layer. In order to enhance the property of the prepared filament, it is preferable that the air gap have a length of 2 to 20 mm.

The coagulation bath 20 is positioned under the spinneret 10, wherein the coagulation bath 20 is filled with a coagulation solution 22. Under the coagulation bath 20, there is the coagulation tube 30. The coagulation tube 30 is connected with the bottom of the coagulation bath 20.

Accordingly, as the spinning dope descends after extruding through the capillary tube 15 of the spinneret 10, the spinning dope is coagulated by sequentially passing through the air gap 17 and the coagulation solution 22, thereby preparing the filament 1. This filament 1 is discharged through the coagulation tube 30. Since the coagulation solution 22 as well as the filament 1 is discharged through the coagulation tube 30, the coagulation bath 20 has to be continuously supplied with the coagulation solution by the discharged amount.

Also, there is a jet opening 35 in the coagulation tube 30 so that the coagulation solution is jetted out from the jet opening 35 to the filament passing through the coagulation tube 30. The jet opening 35 may include the plurality of jet openings, or be formed in a ring shape along the periphery of the coagulation tube 30. Preferably, the plurality of jet openings 35 are arranged in such a way that the angle of the coagulation solution jetted out from the jet openings is completely symmetric with respect to the filament. Preferably, the jetting angle of coagulation solution jetted out from the jet opening is about 0° to 85° with respect to the longitudinal direction of the filament. Especially for the commercial production process, the jetting angle is about 20° to 40°.

Preferably, a distance (L) from the top surface of the coagulation solution 22 contained in the coagulation bath 20 to the jet opening 35 of the coagulation tube 30, and more particularly, to the upper end of the jet opening 35 is within a range between 10 to 35 mm. If the distance (L) is less than 10 mm, the coagulation solution is jetted to the filament being not sufficiently coagulated, whereby crystal orientation of the filament may be damaged. Meanwhile, if the distance (L) is more than 35 mm, the coagulation solution is jetted to the filament being completely coagulated, whereby the surface of filament may be damaged. Thus, a process for jetting the coagulation solution from the jet opening 35 has to be performed under a state the filament is properly coagulated. In this respect, the distance (L) is within the range of 10 to 35 mm.

Preferably, a distance ($L_1$) from the top surface of the coagulation solution 22 contained in the coagulation bath 20 to the bottom of the coagulation bath 20 is within a range between 5 to 15 mm. If the distance ($L_1$) is less than 5 mm, it is difficult to control the spinning process due to an vortex of air. Meanwhile, if the distance ($L_1$) is more than 15 mm, the filament is too coagulated in the coagulation bath 20, thereby making it difficult to set a position of the jet opening 35. That is, if the filament is too coagulated in the coagulation bath 20, the jet opening 35 has to be positioned adjacent to the upper end of the coagulation tube 30 so that the coagulation solution is jetted before the complete coagulation of the filament. However, if the jet opening 35 is positioned too adjacent to the upper end of the coagulation tube 30, it may cause a problem that the coagulation solution is jetted under an insufficient convergence of the filament.

Preferably, a distance ($L_2$) from the bottom of the coagulation bath 20 to the jet opening 35, and more particularly, to the upper end of the jet opening 35 is within a range between 5 to 20 mm. If the distance ($L_2$) is less than 5 mm, the coagulation solution is jetted under an insufficient convergence of the filament, whereby it is difficult to obtain the uniform coagulation in the filament. Meanwhile, if the distance ($L_2$) is more than 20 mm, it may cause a poor pumping for the coagulation solution 22 contained in the coagulation bath 20. That is, when jetting out the coagulation solution from the jet opening 35, a pressure difference is generated between the coagulation bath 20 and the coagulation tube 30, whereby the coagulation solution 22 contained in the coagulation bath 20 is rapidly pumped to the coagulation tube 30. In this case, if the jet opening 35 is positioned at a distance far away from the bottom of the coagulation bath 20, the pumping efficiency for the coagulation solution 22 is lowered.

The plurality of jet openings 35 may be provided at different heights so that the coagulation solution from different positions is jetted to the inside of the coagulation tube 30 through the plurality of jet openings 35. Thus, a drag force applied to the filament is distributed so that the surface of filament becomes uniform and the orientation is improved, thereby preventing the strength of filament from being lowered. Also, the surface uniformity in the filament can be improved since it is possible to prevent the sulfuric acid from being rapidly discharged from the filament.

Preferably, a ratio of a jetting speed ($V_1$) of the coagulation solution jetted out from the jet opening 35 to a discharging speed ($V_2$) of the filament 1 discharged from the coagulation tube 30 may be within a range of 0.8:1 to 1.2:1. If the difference between the jetting speed ($V_1$) of the coagulation solution jetted out from the jet opening 35 and the discharging speed ($V_2$) of the filament 1 discharged from the coagulation tube 30 becomes larger, the surface of filament 1 may be damaged. Especially, if the ratio of $V_1$:$V_2$ is out of this range, the surface of filament 1 may be damaged. In consideration of the discharging speed of the filament 1, the jetting speed of the coagulation solution jetted out from the jet opening 35 is between 150 to 800 mpm, preferably.

The coagulation solution 22 may be a sulfuric acid solution, and more preferably, a solution prepared by adding a sulfuric acid to water, ethylene glycol, glycerol, alcohol, or their mixtures. For the process that the spinning dope passes through the coagulation solution 22, the filament is prepared by removing the sulfuric acid from the spinning dope. At this time, if the sulfuric acid is rapidly removed from the surface of filament, the surface of filament is coagulated before the sulfuric acid comes out of the filament, whereby the uniformity of filament becomes lowered. In order to overcome this problem, the coagulation solution 22 contains the sulfuric acid.

Preferably, a concentration of the sulfuric acid in the coagulation solution 22 is about 5 to 15 weight %. If the concentration of the sulfuric acid is less 5 weight %, the sulfuric acid may be rapidly removed from the filament. Meanwhile, if the concentration of the sulfuric acid is more than 15 weight %, it is difficult that the sulfuric acid comes out from the filament.

Preferably, a temperature of the coagulation solution 22 is within a range between 1 and 10° C. If the temperature of the coagulation solution 22 is below than 1° C., it is difficult that the sulfuric acid comes out from the filament. Meanwhile, if the temperature of the coagulation solution 22 is above than 10° C., the sulfuric acid rapidly comes out from the filament.

Then, the remaining sulfuric acid is removed from the obtained filament.

The sulfuric acid remains in the filament prepared by the spinning process. The sulfuric acid remaining in the filament may be removed by a wet process using water or a mixture of water and alkali solution.

The wet process may include steps, for example, a first step for wetting the filament containing the sulfuric acid in an aqueous caustic solution of 0.3 to 1.3%, and a second step for wetting the filament in an aqueous caustic solution of 0.01 to 0.1%.

Then, a drying process is carried out so as to adjust the amount of water contained in the filament.

The amount of water contained in the filament can be adjustable by controlling a contacting time between the filament and a drying roll, or a temperature in the drying roll.

For the aforementioned spinning, wetting, neutralizing and drying processes, a tension is applied to the filament, wherein an optimized value of the tension applied to the filament for the drying process is determined based on the entire processing conditions. However, it is preferable that the filament be dried under the tension of about 0.1 to 3.0 gpd. If the tension for the drying process is less than 0.1 gpd, the strength of filament is lowered due to the decreased molecular orientation. Meanwhile, if the tension for the drying process is more than 3.0 gpd, the filament may be broken. At this time, a degree of the tension applied to the filament can be controlled by adjusting a surface speed of the roll which moves the filament.

The drying roll is heated by a predetermined means. At this time, the drying roll is at least partially covered with a heat-emission preventing means so as to prevent a heat loss, preferably.

The para-aramid fiber prepared by the aforementioned process according to the present invention in formed in such a structure that an amide group is connected with aromatic rings, the aromatic rings are linearly connected through the amide group, and the surface roughness is the same as or less than RMS 0.2 μm.

The small surface roughness indicates that the surface uniformity is great. The aramid fiber according to the present invention, which has the great surface uniformity, can obtain the great tensile strength of 22 g/d to 26 g/d.

Also, the aramid fiber according to the present invention has an elongation of 2.8 to 3.5%. If the surface of fiber is not uniform, the fiber is apt to be broken by elongation. Since the aramid fiber of the present invention has the great surface uniformity, it is not easily broken by elongation, thereby resulting in the high elongation range.

Also, the aramid fiber of the present invention has a 5N or less of maximum resistance on drawing from a fabric, wherein the fabric is a plain-woven fabric having a weaving density of 260 g/m$^2$, and the plain-woven fabric is made of the aramid fiber having 1500 denier as weft and warp.

Herein, the maximum resistance on drawing from a fabric indicates a maximum resistance when drawing one strand of the fiber from the fabric obtained by weaving the fiber. If the fiber has the uniform surface, it is easy to draw the fiber from the fabric, so that the resistance becomes small. That is, the small resistance on drawing means that the fiber has the great surface uniformity.

3. EMBODIMENTS AND COMPARATIVE EXAMPLES

1) Embodiment 1

After preparing a polymerization solvent by adding $CaCl_2$ to N-methyl-2-pyrrolidone (NMP), para-phenylenediamine is dissolved in the prepared polymerization solvent, to thereby prepare a mixture solution.

While stirring the mixture solution, terephthaloyl dichloride is added to the mixture solution, wherein a mole ratio of the terephthaloyl dichloride is identical to that of the para-phenylenediamine, thereby preparing poly(paraphenylene terephtalamide). Here, a predetermined amount of the terephthaloyl dichloride is first added to the mixture solution for the preliminary polymerization, and then the remaining terephthaloyl dichloride is added to the mixture solution. Then, water and NaOH are added to a polymerized solution containing poly(paraphenylene terephtalamide) so that acid is neutralized. After crushing poly(paraphenylene terephtalamide), the polymerization solvent is extracted from poly(paraphenylene terephtalamide) by using water, and then dehydrating and drying processes are performed thereto, thereby obtaining a final aromatic polyamide.

The final aromatic polyamide is dissolved in concentrated sulfuric acid of 99%, thereby preparing a spinning dope. At this time, a concentration of the aromatic polyamide in the spinning dope is about 20 weight %. After that, the spinning dope is spun through the use of a spinning apparatus shown in FIG. 1. That is, after extruding the spinning dope through a spinneret 10, the spinning dope is coagulated by passing through an air gap 17 having a diameter of 7 mm, a coagulation bath 20 filled with a coagulation solution 22 made of a sulfuric acid solution having a concentration of 10 weight % at a temperature of 5° C., and a coagulation tube 30 positioned under the coagulation bath 20 sequentially, thereby preparing a filament.

At this time, a distance (L) from the top surface of the coagulation solution 22 contained in the coagulation bath 20 to a jet opening 35 of the coagulation tube 30 is 20 mm; a distance ($L_1$) from the top surface of the coagulation solution 22 to the bottom of the coagulation bath 20 is 10 mm; and a distance ($L_2$) from the bottom of the coagulation bath 20 to the jet opening 35 is 10 mm.

Also, a jetting speed ($V_1$) of the coagulation solution jetted out from the jet opening 35 is set equal to a discharging speed ($V_2$) of the filament 1 discharged from the coagulation tube 30. That is, each of the jetting speed ($V_1$) and the discharging speed ($V_2$) is set as 600 mpm.

After that, the remaining sulfuric acid is removed from the filament by a wet process. Then, aramid fiber having 1500 denier is obtained by drying and winding the filament.

2) Embodiment 2

Aramid fiber is obtained by the same method as that of the aforementioned embodiment 1 except that a distance from a distance (L) from a top surface of a coagulation solution 22 contained in a coagulation bath 20 to a jet opening 35 of a coagulation tube 30 is 10 mm; a distance ($L_1$) from the top surface of the coagulation solution 22 to the bottom of the coagulation bath 20 is 5 mm; and a distance ($L_2$) from the bottom of the coagulation bath 20 to the jet opening 35 is 5 mm.

3) Embodiment 3

Aramid fiber is obtained by the same method as that of the aforementioned embodiment 1 except that a distance from a distance (L) from a top surface of a coagulation solution 22 contained in a coagulation bath 20 to a jet opening 35 of a coagulation tube 30 is 35 mm; a distance ($L_1$) from the top surface of the coagulation solution 22 to the bottom of the coagulation bath 20 is 15 mm; and a distance ($L_2$) from the bottom of the coagulation bath 20 to the jet opening 35 is 20 mm.

4) Embodiment 4

Aramid fiber is obtained by the same method as that of the aforementioned embodiment 1 except that a jetting speed ($V_1$) of a coagulation solution jetted out from a jet opening 35 is 700 mpm, and a discharging speed ($V_2$) of a filament 1 discharged from a coagulation tube 30 is 600 mpm.

5) Embodiment 5

Aramid fiber is obtained by the same method as that of the aforementioned embodiment 1 except that a jetting speed ($V_1$) of a coagulation solution jetted out from a jet opening 35 is 500 mpm, and a discharging speed ($V_2$) of a filament 1 discharged from a coagulation tube 30 is 600 mpm.

6) Comparative Example 1

Aramid fiber is obtained by the same method as that of the aforementioned embodiment 1 except that a distance from a distance (L) from a top surface of a coagulation solution 22 contained in a coagulation bath 20 to a jet opening 35 of a coagulation tube 30 is 8 mm; a distance ($L_1$) from the top surface of the coagulation solution 22 to the bottom of the coagulation bath 20 is 5 mm; and a distance ($L_2$) from the bottom of the coagulation bath 20 to the jet opening 35 is 3 mm.

7) Comparative Example 2

Aramid fiber is obtained by the same method as that of the aforementioned embodiment 1 except that a distance (L) from a top surface of a coagulation solution 22 contained in a coagulation bath 20 to a jet opening 35 of a coagulation tube 30 is 40 mm; a distance ($L_1$) from the top surface of the coagulation solution 22 to the bottom of the coagulation bath 20 is 15 mm; and a distance ($L_2$) from the bottom of the coagulation bath 20 to the jet opening 35 is 25 mm.

8) Comparative Example 3

Aramid fiber is obtained by the same method as that of the aforementioned comparative example 2 except that a jetting speed ($V_1$) of a coagulation solution jetted out from a jet opening 35 is 400 mpm, and a discharging speed ($V_2$) of a filament 1 discharged from a coagulation tube 30 is 600 mpm.

9) Comparative Example 4

Aramid fiber is obtained by the same method as that of the aforementioned comparative example 2 except that a jetting speed ($V_1$) of a coagulation solution jetted out from a jet opening 35 is 750 mpm, and a discharging speed ($V_2$) of a filament 1 discharged from a coagulation tube 30 is 600 mpm.

10) Comparative Example 5

Aramid fiber is obtained by the same method as that of the aforementioned comparative example 1 except that a coagulation solution 20 contained in a coagulation bath 20, wherein the coagulation solution 20 is maintained at a temperature of 0° C.

11) Comparative Example 6

Aramid fiber is obtained by the same method as that of the aforementioned comparative example 1 except that a coagulation solution 20 contained in a coagulation bath 20, wherein the coagulation solution 20 is maintained at a temperature of 15° C.

12) Comparative Example 7

Aramid fiber is obtained by the same method as that of the aforementioned comparative example 1 except that a coagulation solution 20 contained in a coagulation bath 20, wherein the coagulation solution 20 is made of a sulfuric acid solution having a concentration of 3 weight %.

13) Comparative Example 8

Aramid fiber is obtained by the same method as that of the aforementioned comparative example 1 except that a coagulation solution 20 contained in a coagulation bath 20, wherein the coagulation solution 20 is made of a sulfuric acid solution having a concentration of 20 weight %.

The aforementioned embodiments and comparative examples can be summarized as the following Table 1.

TABLE 1

|  | L (mm) | $L_1$ (mm) | $L_2$ (mm) | $V_1$ (mpm) | $V_2$ (mpm) | $V_1:V_2$ | Temperature of coagulation solution (° C.) | Concentration of coagulation solution (weight %) |
|---|---|---|---|---|---|---|---|---|
| Embodiment 1 | 20 | 10 | 10 | 600 | 600 | 1:1 | 5 | 10 |
| Embodiment 2 | 10 | 5 | 5 | 600 | 600 | 1:1 | 5 | 10 |
| Embodiment 3 | 35 | 15 | 20 | 600 | 600 | 1:1 | 5 | 10 |
| Embodiment 4 | 20 | 10 | 10 | 700 | 600 | 1.17:1 | 5 | 10 |
| Embodiment 5 | 20 | 10 | 10 | 500 | 600 | 0.83:1 | 5 | 10 |
| Comparative example 1 | 8 | 5 | 3 | 600 | 600 | 1:1 | 5 | 10 |
| Comparative example 2 | 40 | 15 | 25 | 600 | 600 | 1:1 | 5 | 10 |
| Comparative example 3 | 40 | 15 | 25 | 400 | 600 | 0.67:1 | 5 | 10 |
| Comparative example 4 | 40 | 15 | 25 | 750 | 600 | 1.25:1 | 5 | 10 |
| Comparative example 5 | 8 | 5 | 3 | 600 | 600 | 1:1 | 0 | 10 |
| Comparative example 6 | 8 | 5 | 3 | 600 | 600 | 1:1 | 15 | 10 |
| Comparative example 7 | 8 | 5 | 3 | 600 | 600 | 1:1 | 5 | 3 |
| Comparative example 8 | 8 | 5 | 3 | 600 | 600 | 1:1 | 5 | 20 |

In this Table 1, "L" indicates the distance from the upper surface of the coagulation solution 22 contained in the coagulation bath 20 to the jet opening 35; "$L_1$" indicates the distance from the upper surface of the coagulation solution 22 contained in the coagulation bath 20 to the bottom of the coagulation bath 20; "$L_2$" indicates the distance from the bottom of the coagulation bath 20 to the jet opening 35; "$V_1$" indicates the jetting speed of the coagulation solution jetted out from the jet opening 35; and "$V_2$" indicates the discharging speed of the filament 1 discharged from the coagulation tube 30.

4. EXPERIMENTAL EXAMPLES

1) Measuring Surface Roughness of Aramid Fiber

Samples are prepared by cutting aramid fibers of the respective embodiments and comparative examples, wherein each aramid fiber has a length of 25 cm. Then, a surface roughness for each sample is measured by AFM (Atomic Force Microscopy) corresponding to a surface-roughness measuring apparatus.

In more detail, after stably fixing each sample in a V-shaped groove of a substrate, the surface roughness for each sample is measured by Nanoscope III a Multimode made by Digital Instruments in England. The results will be shown in the following Table 2.

2) Measuring Tensile Strength of Aramid Fiber

Samples are prepared by cutting aramid fibers of the respective embodiments and comparative examples, wherein each aramid fiber has a length of 25 cm. Then, a tensile strength for each sample is measured by an experimental method of ASTM D-885.

In more detail, a force (g) is measured when each sample is broken at a stretching speed 300 mm/minute by using Instron tester (Instron Engineering Corp, Canton, Mass.). Then, the measured force is divided by a denier of the sample, thereby measuring a tensile strength (g/d). The results will be shown in the following Table 2.

3) Measuring Elongation of Aramid Fiber

Samples are prepared by cutting aramid fibers of the respective embodiments and comparative examples, wherein each aramid fiber has a length of 25 cm. Then, an elongation for each sample is measured.

In more detail, an elongated length is measured when each sample is broken at a stretching speed 300 mm/minute by using Instron tester (Instron Engineering Corp, Canton, Mass.), and then an elongation (%) is calculated. The results will be shown in the following Table 2.

4) Measuring Maximum Resistance on Drawing Aramid Fiber from a Fabric

Samples are prepared by plainly weaving a fabric with a size of 80 mm×80 mm, wherein the fabric is made with the weft and warp using aramid fibers according to the respective embodiments and comparative examples. At this time, the fabric is made with a weaving density of 260 g/m². Then, a maximum resistance on drawing aramid fiber for each sample is measured when drawing one strand of aramid fiber from the fabric.

In more detail, a maximum force (N) is measured when drawing one strand of aramid fiber from each sample at a stretching speed 300 mm/minute by using Instron tester (Instron Engineering Corp, Canton, Mass.). The results will be shown in the following Table 2.

TABLE 2

|  | Surface Roughness (μm) | Tensile Strength (g/d) | Elongation (%) | Maximum resistance on drawing from a fabric (N) |
|---|---|---|---|---|
| Embodiment 1 | 0.10 | 25.5 | 3.45 | 3.9 |
| Embodiment 2 | 0.18 | 22.9 | 3.15 | 4.9 |
| Embodiment 3 | 0.11 | 25.2 | 3.43 | 4.1 |
| Embodiment 4 | 0.13 | 24.1 | 3.27 | 4.3 |
| Embodiment 5 | 0.15 | 23.5 | 3.24 | 4.6 |
| Comparative example 1 | 0.25 | 21.5 | 2.75 | 5.2 |
| Comparative example 2 | 0.21 | 21.7 | 2.79 | 5.1 |
| Comparative example 3 | 0.28 | 21.2 | 2.71 | 5.5 |
| Comparative example 4 | 0.27 | 21.3 | 2.73 | 5.3 |
| Comparative example 5 | 0.27 | 21.4 | 2.72 | 5.4 |
| Comparative example 6 | 0.32 | 21.0 | 2.70 | 5.7 |

TABLE 2-continued

|  | Surface Roughness (μm) | Tensile Strength (g/d) | Elongation (%) | Maximum resistance on drawing from a fabric (N) |
|---|---|---|---|---|
| Comparative example 7 | 0.35 | 20.5 | 2.64 | 5.9 |
| Comparative example 8 | 0.40 | 20.0 | 2.60 | 6.2 |

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of preparing a para-aramid fiber comprising:
preparing an aromatic polyamide by polymerizing aromatic diamine with aromatic diacid halide;
preparing a spinning dope by dissolving the aromatic polyamide in a solvent;
extruding the spinning dope through a spinneret; and
sequentially passing the spinning dope through an air gap, a coagulation bath filled with a coagulation solution, and a coagulation tube having a jet opening to obtain a filament,
wherein the coagulation tube is connected with a bottom of the coagulation bath,
wherein a distance from the upper surface of the coagulation solution contained in the coagulation bath to the jet opening of the coagulation tube is within a range between 10 and 35 mm, and
wherein a distance from the bottom of the coagulation bath to the jet opening is within a range between 5 and 20 mm.

2. A method of preparing a para-aramid fiber comprising:
preparing an aromatic polyamide by polymerizing aromatic diamine with aromatic diacid halide;
preparing a spinning dope by dissolving the aromatic polyamide in a solvent;
extruding the spinning dope through a spinneret; and
sequentially passing the spinning dope through an air gap, a coagulation bath filled with a coagulation solution, and a coagulation tube having a jet opening to obtain a filament,
wherein the coagulation tube is connected with a bottom of the coagulation bath,
wherein a distance from the upper surface of the coagulation solution contained in the coagulation bath to the jet opening of the coagulation tube is within a range between 10 and 35 mm, and
wherein a distance from the upper surface of the coagulation solution contained in the coagulation bath to the bottom of the coagulation bath is within a range between 5 to 15 mm.

3. The method of claim 1, wherein the plurality of jet opening are arranged at different heights so that a coagulation solution from different positions is jetted to the inside of the coagulation tube therethrough.

4. The method of claim 1, wherein a ratio of a jetting speed of the coagulation solution jetted out from the jet opening to a discharging speed of the filament discharged from the coagulation tube is within a range of 0.8:1 to 1.2:1.

5. The method of claim 4, wherein the jetting speed of the coagulation solution jetted out from the jet opening is within a range between 150 to 800 mpm.

6. The method of claim 1, wherein the coagulation solution contained in the coagulation bath is a sulfuric acid solution, and a concentration of the sulfuric acid solution is within a range between 5 to 15 weight %.

7. The method of claim 1, wherein the coagulation solution contained in the coagulation bath is a sulfuric acid solution, and the sulfuric acid solution is maintained at a temperature between 1 to 10° C.

8. The method of claim 1, wherein the jet opening is arranged so that a jetting angle of the coagulation solution jetting out from the jet opening is 20° to 40° with respect to the longitudinal direction of the filament.

9. The method of claim 2, wherein the plurality of jet opening are arranged at different heights so that a coagulation solution from different positions is jetted to the inside of the coagulation tube therethrough.

10. The method of claim 2, wherein a ratio of a jetting speed of the coagulation solution jetted out from the jet opening to a discharging speed of the filament discharged from the coagulation tube is within a range of 0.8:1 to 1.2:1.

11. The method of claim 10, wherein the jetting speed of the coagulation solution jetted out from the jet opening is within a range between 150 to 800 mpm.

12. The method of claim 2, wherein the coagulation solution contained in the coagulation bath is a sulfuric acid solution, and a concentration of the sulfuric acid solution is within a range between 5 to 15 weight %.

13. The method of claim 2, wherein the coagulation solution contained in the coagulation bath is a sulfuric acid solution, and the sulfuric acid solution is maintained at a temperature between 1 to 10° C.

14. The method of claim 2, wherein the jet opening is arranged so that a jetting angle of the coagulation solution jetting out from the jet opening is 20° to 40° with respect to the longitudinal direction of the filament.

* * * * *